United States Patent [19]

Kojima

[11] Patent Number: 5,311,113
[45] Date of Patent: May 10, 1994

[54] METHOD OF SETTING PEAK-TIMER OF ELECTRIC CHARGER

[75] Inventor: Makio Kojima, Yokohama, Japan

[73] Assignee: Furukawa Denchi Kabushiki Kaisha, Yokohama, Japan

[21] Appl. No.: 897,049

[22] Filed: Jun. 11, 1992

[30] Foreign Application Priority Data

Jun. 15, 1991 [JP] Japan ............................. 3-240166

[51] Int. Cl.$^5$ ............................................. H02J 7/04
[52] U.S. Cl. ......................................... 320/20; 320/23; 320/31
[58] Field of Search ...................... 320/20, 22, 23, 24, 320/31, 37, 38

[56] References Cited

U.S. PATENT DOCUMENTS

| | | | |
|---|---|---|---|
| 3,794,905 | 2/1974 | Long | 320/20 |
| 4,223,262 | 8/1980 | Ballman | 320/38 X |
| 4,439,719 | 3/1984 | Lambert et al. | 320/31 |
| 4,609,861 | 9/1986 | Inaniwa et al. | 320/23 X |
| 4,992,720 | 2/1991 | Hata | 320/23 |
| 5,206,579 | 4/1993 | Kawate et al. | 320/20 |

FOREIGN PATENT DOCUMENTS 2426921  1/1976  Fed. Rep. of Germany ........ 320/37
2251346  7/1992  United Kingdom .

Primary Examiner—Kristine L. Peckman
Attorney, Agent, or Firm—Armstrong, Westerman, Hattori, McLeland & Naughton

[57] ABSTRACT

A method for charging a storage battery includes providing an electric charger having a rapid charge voltage level and a trickle charge voltage level, a total-timer for measuring a total time which has elapsed since initiation of a charging operation, a peak-timer for measuring an amount of time which has elapsed since a peak voltage is reached during rapid charging of the storage battery, and an arithmetic circuit in the peak timer for determining a function of an elapsed time and a value of a charging rate. The arithmetic circuit of the peak-timer determines an elapsed time value of the peak-timer as a function of an elapsed time value of the total-timer and a value of a charging rate. The elapsed time value of the peak-timer is initially set at substantially the same time as an initial setting of a value of the total-timer. The peak-timer is started at a predetermined elapsed time after starting of a rapid charging operation.

2 Claims, 2 Drawing Sheets

METHOD OF SETTING PEAK-TIMER OF ELECTRIC CHARGER

BACKGROUND OF THE INVENTION

1. Field of the Invention

The present invention relates to a method of setting a peak-timer when a storage battery is to be rapidly charged.

2. Description of the Related Art

It is well known to use secondary batteries, especially Ni—Cd types, in various fields as power sources for cordless telephones, video recorders and other home electric appliances. The Ni—Cd type of storage battery is frequently used, and during its use thereof, charging must be performed often, usually by what is commonly referred to as a "rapid charge" or "quick charge" method. In general, the rapid charging is carried out for about 1-2 hours at a charging rate in the range of 0.5° C.-1.5° C., where C represents a current value equal to the normal capacity of the battery in amp-hours. However, charging rates vary with different types of batteries.

Rapid charging subjects the storage battery to severe treatment, and therefore it is necessary to control rapid charging so as to prevent overcharging Regarding systems for detecting rapid charging, a $-\Delta V$ system, a voltage detecting system, etc. have been put into practical use. Further, in order to prevent the battery from damage resulting from rapid charging, at least one of a total-timer, a temperature protective device and a voltage protection device is provided and actuated. Here, the total-timer refers to a device that regulates a period of time from a starting time point to an ending time point of the rapid charging, so that the charging operation occurs only for a predetermined period of time. Typically, a total-timer is used together with a peak-timer. The peak-timer starts its charging operation with the detection of a peak value of a charging voltage, and the charging operation is then stopped after a predetermined elapsed time after detection of the peak voltage value by either the total-timer or the peak-timer, whichever expires earlier.

When a total-timer is conventionally operated in a rapid charging operation, the setting and starting of the operation of the peak-timer are carried out without any time-relationship established between the peak-timer and the total-timer. Namely, the setting and starting operations of the total-timer are performed first, and when the peak value of the charging voltage is detected after a lapse of time from the start of rapid charging, the setting and starting operations of the peak-timer are then performed. Accordingly, it is typically necessary to treat the setting and starting operations of the total-timer and those of the peak-timer separately from each other, which can become burdensome to an operator.

SUMMARY OF THE INVENTION

An object of the present invention is to provide a method for setting an elapsed time in a peak-timer in an electric charger which is free from the foregoing defects, and in which the setting of the elapsed time in a peak-timer is carried out almost coincidentally with the setting of the elapsed time of a total-timer, resulting in easy handling for an operator In order to achieve the foregoing object, the present invention provides a method for setting an elapsed time in a peak-timer of an electric charger in which the electric charger is provided with both a total-timer and a peak-timer, and a storage battery is rapidly charged by the electric charger, wherein the electric charger has an elapsed time value of the peak-timer computed as a function of an elapsed time value of the total timer and a value of charging rate The elapsed time value of the peak-timer is obtained by an arithmetic circuit and is initially set almost simultaneously with an initial setting of an elapsed time value for the total timer, and thereafter the peak-timer is started at a predetermined elapsed time after rapid charging has begun.

In the present invention, if there is a storage battery to be rapidly charged, in accordance with the type and condition of the battery, a value for an elapsed time of the total timer is determined, which is set in the total-timer. Since the value for an elapsed time of the total-timer and a value for the charging rate are both known, a value for an elapsed time of the peak-timer is computed based on the foregoing known values by means of an arithmetic circuit, and is set at the value of the electric charger. The arithmetic circuit has an operational expression contained therein, and therefore, predetermined data are inputted therein and the peak-timer elapsed time value is soon computed Next, the storage battery to be charged is connected to the electric charger, and the rapid charging operation is started. The voltage between the terminals of the storage battery is transmitted to a data processor through an voltage measurement line, and is always monitored. The peak value of the voltage is measured, and when it is changed by a value of $-V$, the rapid charging rate is shifted or changed over to a trickle charging rate. As long as the measured voltage does not drop by a value of $-V$ or more, the rapid charging rate is continued.

The peak-timer starts its operation at a predetermined elapsed time after the rapid charging is started. The operation of the peak-timer previously set is started by an operator, or may be started by the command from the data processor measuring the voltage peak value. Thereafter, when either the total-timer or the peak-timer expires, rapid charging is stopped at that moment.

DESCRIPTION OF THE PREFERRED EMBODIMENTS

Figure 1:
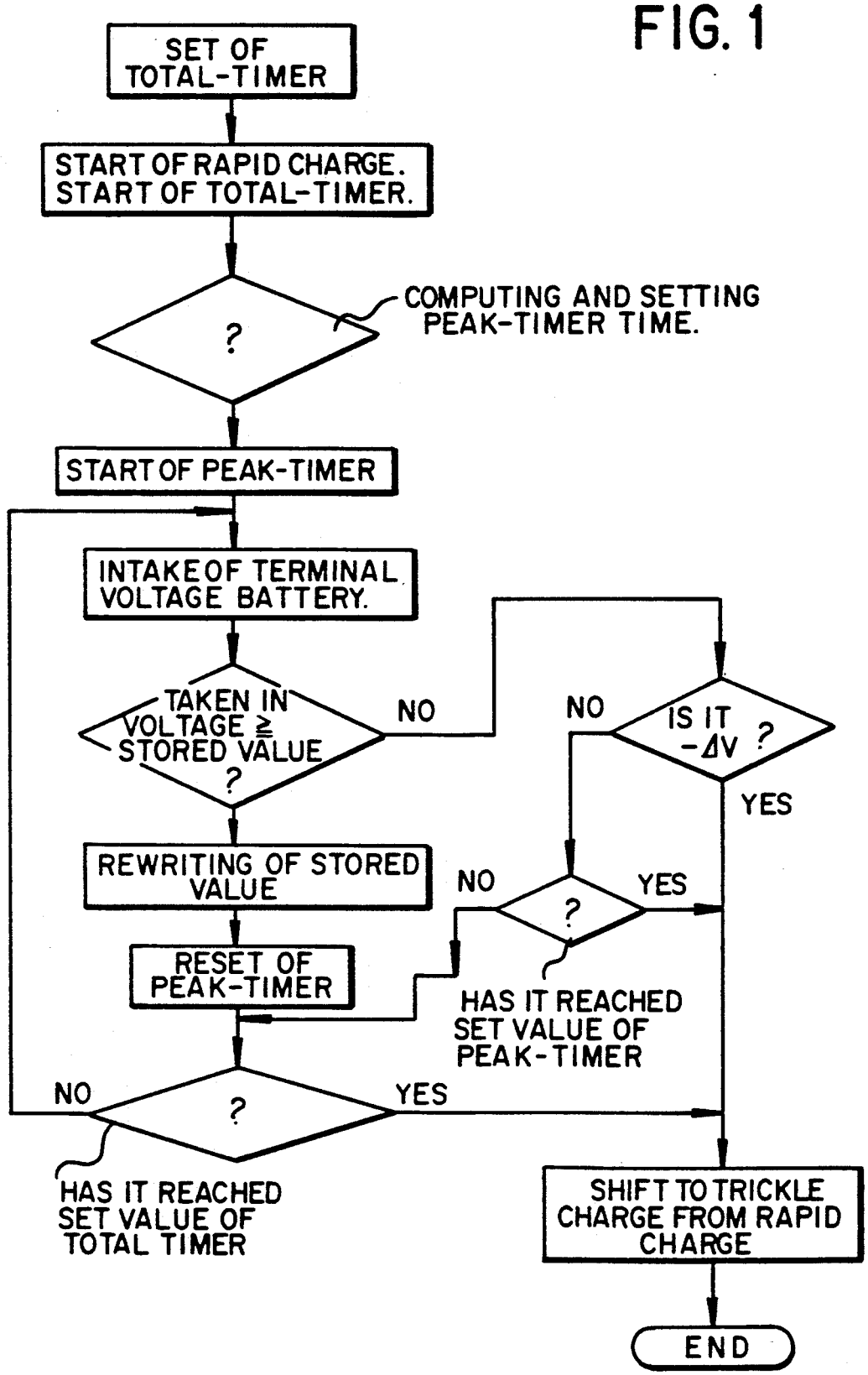
FIG. 1 is a flow chart of the operation of one embodiment of the present invention using a data processor.
Figure 2:
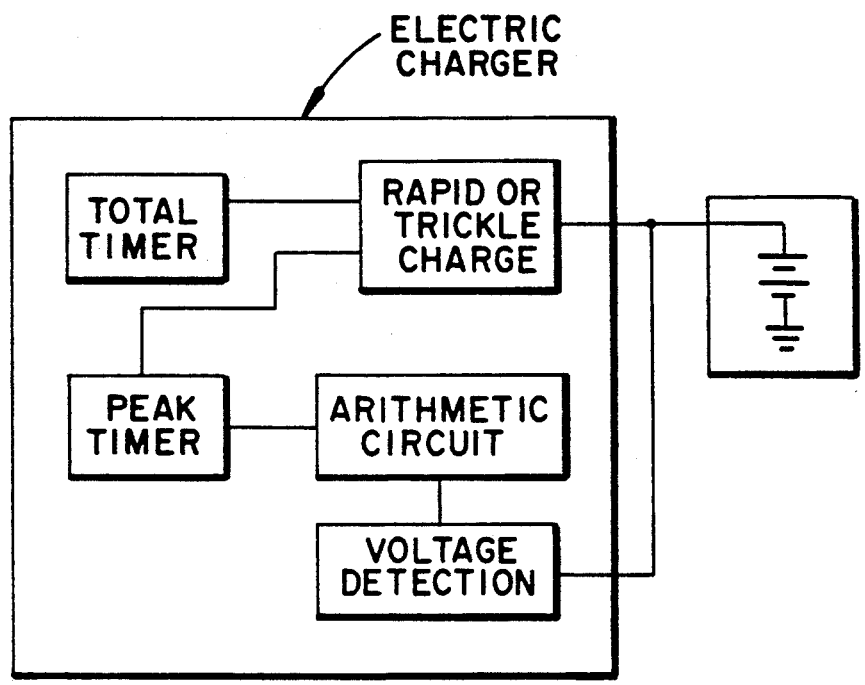
FIG. 2 is one embodiment to carry out the operation shown in FIG. 1.

In FIG. 1, an elapsed time value of a total-timer (shown in FIG. 2) is set at step 1, the rapid charge operation and the total timer are started at step 2, and, computing and setting of an elapsed time value of a peak-timer (shown in FIG. 2) are carried out as shown in step 3. An arithmetic circuit (shown in FIG. 2) capable of division, multiplication, addition and subtraction, is used for the computation and the resultant elapsed time value of the peak-timer is set at the peak-timer provided within an electric charger. In step 4, the peak-timer is started. In the preferred embodiment, the peak-timer is started before the voltage between both the terminals of the storage battery (shown in FIG. 2) reaches the peak value, because the peak-timer is intended to be reset before the elapsed time of the peak-timer expires, as will be explained below. In step 5, the voltage between both the terminals of the storage battery is taken and measured by a voltage detection means (shown in FIG. 2). In step 6, a decision is made as to whether or not the voltage value measured in step 5 is greater than or equal to a stored value. Here, if the decision is affirmative, i.e., when the voltage remains unchanged or is rising, the stored value is rewritten in step 7, and the peak-timer is reset in step 8, and the operation is advanced to step 9.

In the above-mentioned step 6, if the decision is negative, i.e., when the intake voltage is lower than the stored voltage, whether or not it reaches $-\Delta V$ is decided in step 10. If the decision is affirmative, signalling that rapid charging is completed, the rapid charging operation is shifted or changed-over to trickle charging at step 11. If the decision is negative, i.e., when it is a smaller drop than $-\Delta V$, whether or not it reaches the elapsed time set value of the peak-timer is decided in step 12. If the decision in step 12 is affirmative, i.e., when it reaches the peak-timer elapsed time set value, the operation then shifts from rapid charging to trickle charging at step 11. If the decision is negative, i.e., the peak-timer elapsed time set value is not reached, the operation is advanced to step 9.

In step 9, a decision is made regarding whether or not the total-timer elapsed time set value is reached. If the decision is affirmative, i.e., when the total-timer elapsed time expires, rapid charging is shifted to trickle charging. If the decision is negative, i.e., when the total-timer elapsed time does not expire, the operation is returned to step 5, and the foregoing operation is repeated.

Thus, the operation is carried out according to the flow chart of operation illustrated in FIG. 1, and therefore the computing and setting of the elapsed time set value of the peak-timer can be carried out simply and easily. In addition, if the flow chart of operation is programmed so as to effect the peak-timer reset processing, the peak-timer can be suitably started.

An example of the computing of the value of the peak-timer will be explained below. In a previously set electric charger used for the Ni—Cd type of battery, the rapid charging current is set to be 1.2 A, the trickle charge current is set to be 80 mA, a 4-bit microcomputer is used as a data processor, and a total-timer set value is determined to be 120 minutes (T1). In this case, a value T2 of a peak timer can be computed by the following operational expression:

$$T2=(T1/16)+/-1$$

This expression is experimentally obtained by taking into consideration the charging rate value or factor in the case of the Ni—Cd type of battery. Therefore, e.g., if T1=120 minutes, then T2=8 minutes. In the case of other types of batteries, the operational expression may be different from the above operational expression.

Thus, according to the present invention, the peak-timer elapsed time set value T2 is obtained by using an arithmetic circuit or a microcomputer, and therefore the elapsed time value T2 can be obtained and set very quickly and easily. In addition, since the setting of the elapsed timer value T2 of the peak-timer is carried out almost simultaneously with the setting of the elapsed time value of the total-timer, the conventional complicated setting of a peak-timer elapsed time value can be avoided, the computing and setting of the peak-timer becomes simple, and rapid charging operation becomes very easy for an operator.

What is claimed is:

1. A method for charging a storage battery using an electric charger, comprising the steps of:
    providing an electric charger having a total-timer, a peak-timer, a voltage detecting means for detecting storage battery voltage during charging, a rapid charge voltage level, and a trickle charge voltage level; said electric charger having an arithmetic circuit;
    setting a first predetermined set time as a predetermined total time for operation at a rapid charge voltage level;
    using said arithmetic circuit to produce a second set time as a function of said first predetermined set time, said second set time being a predetermined time limit for operation of the electric charger at said rapid charge voltage level after a peak voltage is reached;
    starting a charging operation using said electric charger at a rapid charging rate;
    using said total-timer for measuring a first elapsed time which is a total time which has elapsed since initiation of said charging operation;
    using said voltage detecting means to detect said storage battery voltage and providing the detected storage battery voltage to said arithmetic circuit;
    using said arithmetic circuit to compare a previous highest value of said storage battery voltage with a current value of said storage battery voltage, to determine occurrence of a peak detected voltage;
    using said peak-timer for measuring a second elapsed time which is an amount of time which has elapsed since occurrence of said peak detected voltage reached during said rapid charging of the storage battery; and
    changing said rapid charge voltage level during said charging operation to said trickle charge voltage level after either elapse of said first predetermined set time for initiation of said charging operation, or elapse of said second set time after occurrence of said peak detected voltage.

2. A method for charging a storage battery as claimed in claim 1, wherein in said step of using said arithmetic circuit to determine a second set time as a function of said first predetermined set time, initially setting said second predetermined time at substantially a same time as setting of said first predetermined set time.

* * * * *